US012134547B2

(12) United States Patent
Bu

(10) Patent No.: US 12,134,547 B2
(45) Date of Patent: Nov. 5, 2024

(54) HYDRAULIC WINCH CONTROL

(71) Applicant: Schlumberger Technology Corporation, Sugar Land, TX (US)

(72) Inventor: Fanping Bu, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 365 days.

(21) Appl. No.: 17/785,137

(22) PCT Filed: Dec. 17, 2020

(86) PCT No.: PCT/US2020/065771
§ 371 (c)(1),
(2) Date: Jun. 14, 2022

(87) PCT Pub. No.: WO2021/127288
PCT Pub. Date: Jun. 24, 2021

(65) Prior Publication Data

US 2023/0014275 A1 Jan. 19, 2023

Related U.S. Application Data

(60) Provisional application No. 62/949,473, filed on Dec. 18, 2019.

(51) Int. Cl.
*B66D 1/08* (2006.01)
*B66D 1/48* (2006.01)
*E21B 19/084* (2006.01)

(52) U.S. Cl.
CPC ............... *B66D 1/485* (2013.01); *B66D 1/08* (2013.01); *E21B 19/084* (2013.01)

(58) Field of Classification Search
CPC .......... B66D 1/08; B66D 1/485; E21B 19/084
See application file for complete search history.

(56) References Cited

U.S. PATENT DOCUMENTS

2006/0192188 A1 8/2006 Sanders et al.
2014/0166271 A1 6/2014 Khvoshchev et al.
(Continued)

FOREIGN PATENT DOCUMENTS

EP 3293351 A1 3/2018
GB 2515453 A * 12/2014 ............ B60W 10/30

OTHER PUBLICATIONS

International Search Report and Written Opinion issued in International Patent application PCT/US2020/065771 on Apr. 13, 2021, 10 pages.
(Continued)

*Primary Examiner* — Mark A Connolly
(74) *Attorney, Agent, or Firm* — Jeffrey D. Frantz

(57) ABSTRACT

A method for controlling a hydraulic winch includes acquiring measurements from sensors coupled to the hydraulic winch. A first control function is computed based on the measurements. The first control function sets pressure across a variable displacement motor that produces motion of the tool string following a desired motion trajectory. A second control function is computed. The second control function sets displacement of a variable displacement pump that causes the pressure across the variable displacement motor to track the first control function. A pump command is selected based on the second control function. The pump command is transmitted to the variable displacement pump. The tool string moves responsive to the pump command.

20 Claims, 7 Drawing Sheets

(56) References Cited

U.S. PATENT DOCUMENTS

| | | | |
|---|---|---|---|
| 2016/0229672 | A1 | 8/2016 | Breard et al. |
| 2017/0107074 | A1 | 4/2017 | Georget et al. |

OTHER PUBLICATIONS

Aschemann et al., Decentralised flatness-based control of a hydrostatic drive train subject to actuator uncertainty and disturbances. 2013 18th International Conference on Methods Models in Automation Robotics (MMAR). 6 pages.

Bender et al., A Flexible System Architecture for Acquisition and Storage of Naturalistic Driving Data, IEEE Transactions on Intelligent Transportation Systems 17(6), pp. 748-1761, 2016.

Bu et al., Indirect Adaptive Robust Controller Design for Drilling Rotary Motion Control. ASME Dynamic Systems and Control Conference. San Antonio, TX, 7 pages, 2014.

Bu et al., Pneumatic brake control for precision stopping of heavy-duty vehicles, IEEE Transactions on Control Systems Technology 15(1), pp. 53-64, 2007.

Manring et al., Modeling and Designing a Hydrostatic Transmission With a Fixed-Displacement Motor, Journal of Dynamic Systems, Measurement, and Control 120(1): pp. 45-49, 1998.

Sun et al., Sliding-mode control of a hydrostatic drive train with uncertain actuator dynamics. 2013 European Control Conference (ECC), pp. 3216-3221, 2013.

Sun et al., A Backstepping Sliding Mode Control for a Hydrostatic Transmission with Unknown Disturbances, IFAC—PapersOnLine 49(18), pp. 879-884, 2016.

Xu et al., Output feedback adaptive robust precision motion control of linear motors, Automatica 37(7), pp. 1029-1039, 2001.

Yao et al., Adaptive robust motion control of single-rod hydraulic actuators: Theory and experiments, IEEE/ASME Transactions on Mechatronics 5(1), pp. 79-91, Mar. 2000.

Yao et al., Smooth robust adaptive sliding mode control of manipulators with guaranteed transient performance. Proceedings of 1994 American Control Conference, pp. 1176-1180, Jun. 1994.

Yao et al., Adaptive robust control of SISO nonlinear systems in a semi-strict feedback form, Automatica 33(5), pp. 893-900, 1997.

International Preliminary Report on Patentability issued in International Patent application PCT/US2020/065771, mailed Jun. 30, 2022, 7 pages.

Aarenstrup, Roger, Managing Model-Based Design. The MathWorks, Inc., Natik, MA, USA, 2015, Chapter 1, pp. 4-12, 19 pages.

Krisric et al., Nonlinear and Adaptive Control Design, Chapter 3, pp. 87-121, Wiley-Interscience, 1995.

Newman, Sam, Building Microservices, Designing Fine-Grained Systems, OReilly Media, Inc., 2015, Chapter 1, 31 pages.

Sastry et al., Adaptive Control: Stability, Convergence, and Robustness. Prentice-Hall Advanced Reference Series (Engineering), 1989, pp. 250-251.

Turnbull, J., The Docker Book: Containerization is the new virtualization, 2019, Chapter 1, 83 pages.

* cited by examiner

HYDRAULIC WINCH CONTROL

CROSS-REFERENCE TO RELATED APPLICATION

The present document is the National Stage Entry of International Application No. PCT/US2020/065771, filed Dec. 17, 2020, is based on and claims priority to U.S. Provisional Application Ser. No. 62/949,473, filed Dec. 18, 2019, which is incorporated herein by reference in its entirety.

BACKGROUND

Wireline operations, such as logging or intervention, are widely used in oil and gas industry to perform operation in a wellbore. The various operation performed using wireline tools include measurement of the properties of a formation using electronic instruments, repositioning of downhole flow control devices, etc. In wireline operations, a tool string is lowered into the wellbore by means of cable and winch.

SUMMARY

Apparatus and methods for controlling a hydraulic winch are disclosed herein. In one example, a method for controlling a hydraulic winch includes acquiring measurements from sensors coupled to the hydraulic winch. A first control function is computed based on the measurements. The first control function sets pressure across a variable displacement motor that produces motion of the tool string following a desired motion trajectory. A second control function is computed. The second control function sets displacement of a variable displacement pump that causes the pressure across the variable displacement motor to track the first control function. A pump command is selected based on the second control function. The pump command is transmitted to the variable displacement pump. The tool string moves responsive to the pump command.

BRIEF DESCRIPTION OF THE DRAWINGS

For a detailed description of various examples, reference will now be made to the accompanying drawings in which.

DETAILED DESCRIPTION

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

Figure 1:
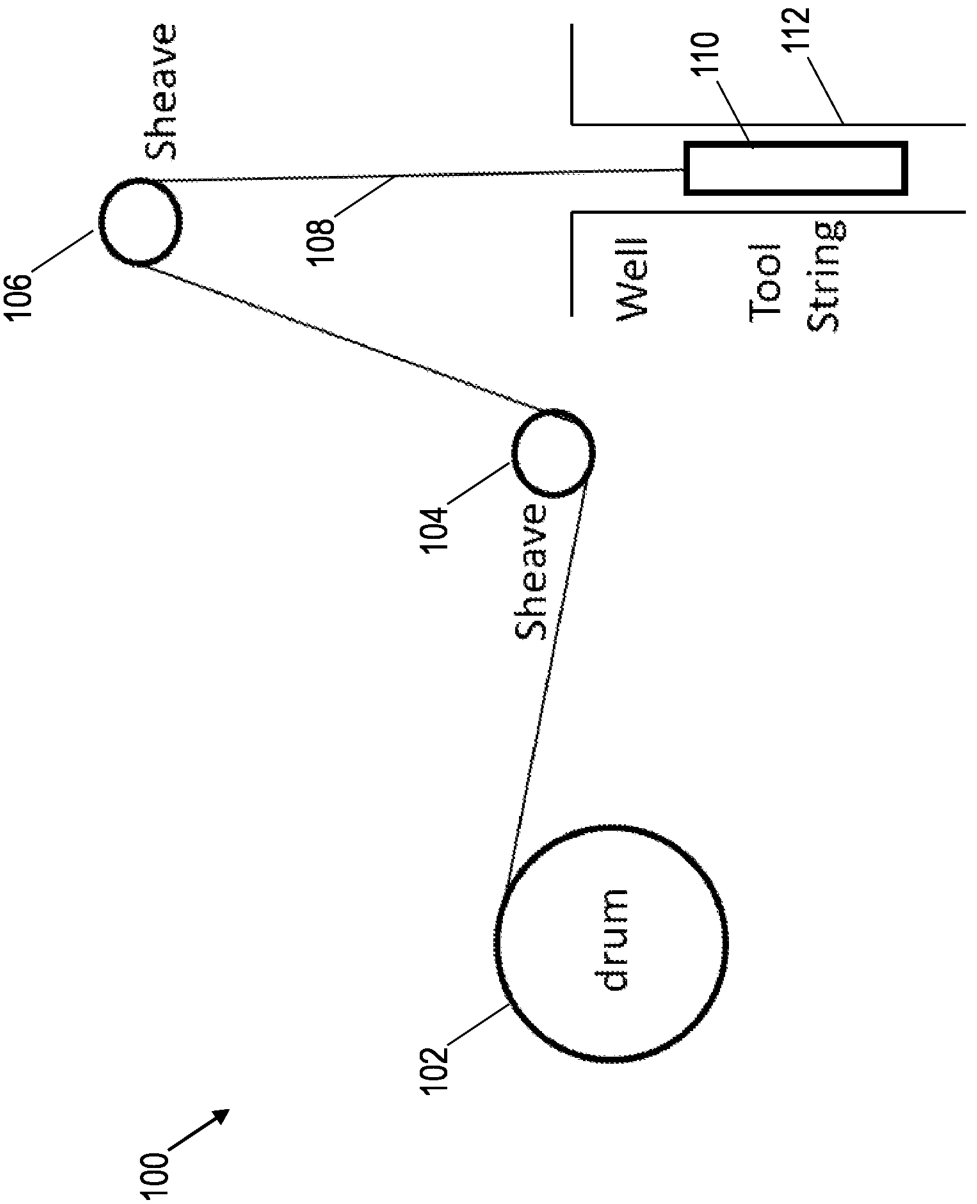
FIG. 1 shows an example wireline logging system in accordance with the present disclosure.

FIG. 1 shows an example wireline logging system 100 suitable for use in the oil and gas operations. The wireline logging system 100 includes a drum 102, sheaves 104 and 106, a cable 108, and a tool sting 110. The cable 108 is coupled the tool string 110, passes over the sheaves 104 and 106, and is wound about the drum 102. The drum 102 is driven by a hydraulic winch. The tool string 110 may include various tools for performing downhole operations. For example, the tool string 110 may include formation measurement sensors. Drum rotation driven by the hydraulic winch moves the tool string 110 up and down within the wellbore 112. Sensors included in the tool string 110 conduct sensing measurement while moving within the wellbore 112 and send measurement results to a system on the surface through the cable 108.

In conventional wireline operations, a human operator manually controls the hydraulic winch to provide tool string movement that follows a desired motion profile. The winch control system disclosed herein controls hydraulic winch or tool string motion following a desired motion profile automatically without operator intervention.

Figure 2:
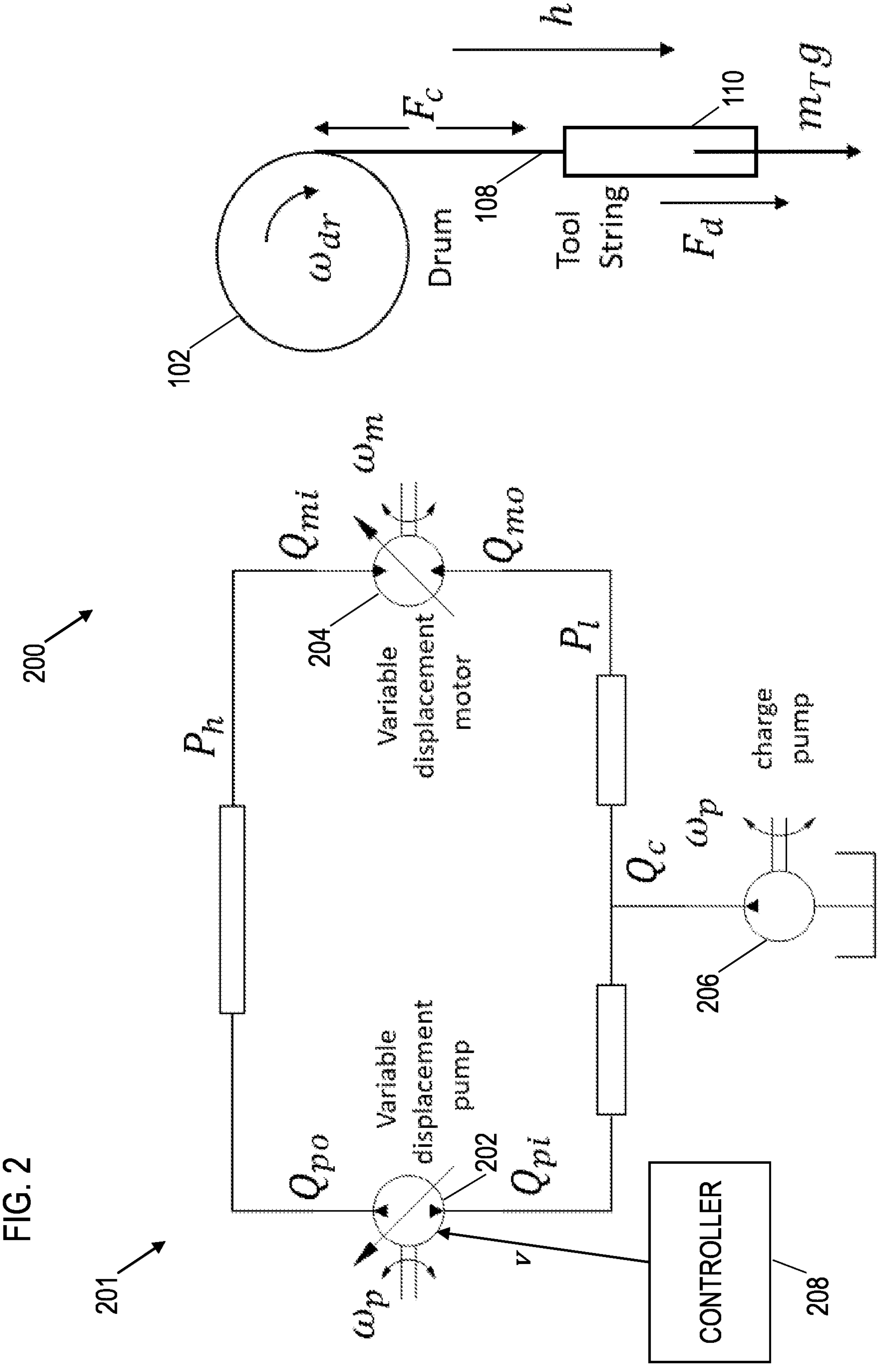
FIG. 2 shows an example hydraulic winch in accordance with the present disclosure.

FIG. 2 shows a schematic representation of a hydraulic winch 200 in accordance with this description. The hydraulic winch 200 drives the drum 102 through a geared transmission. As shown in FIG. 2, the hydraulic winch 200 includes a hydrostatic transmission system 201 that includes a variable displacement pump 202, a variable displacement motor 204, and a charge pump 206. The pumps 202, 206 may be driven by an engine, such as an internal combustion engine, an electric motor, etc. through gears or other power transmission arrangement. The drum 102 is driven by the variable displacement motor 204 through transmission gears. The hydrostatic transmission system 201 has a number of advantages such as: high power density, continuously-variable transmissions, and the ability to deliver high torque at low speed. Therefore, hydrostatic transmission is used in a variety of applications including mining, construction and farming equipment. However, hydrostatic transmission systems are subject to various nonlinearities and uncertainties. In addition to the typical nonlinearities and uncertainties seen in a hydrostatic transmission application, in oil and gas applications the large force applied, and the changing effective drum radius and mass/inertia due to reeling in or releasing cable further complicate controller design. Thus, the winch control systems disclosed herein apply a nonlinear model-based controller to deliver the high performance of a closed loop controller in the system shown in FIGS. 1 and 2.

Adaptive robust control (ARC) addresses control of nonlinear systems with both parametric and nonlinear uncertainties, and has been applied to application areas such as linear motors, electro-hydraulic systems, vehicle control, and drilling control. ARC utilizes fast nonlinear robust feedback to attenuate overall system uncertainties for a guaranteed baseline performance. Parameter adaptation is applied to further improve system performance by reducing parametric uncertainties. Backstepping via Lyapunov functions may be used to design the control law systematically.

The hydraulic winch 200 can be separated into two parts: winch hydraulics and winch mechanics. Winch hydraulics includes a variable displacement pump 202 driven by an engine through fixed gears. The hydraulic fluid flow going in and out the variable displacement pump 202 is modelled by following equations:

$$Q_{pi}=D_p\omega_p D_p=G_p\alpha\alpha=f(v) \tag{1}$$

$$Q_{po}=\eta_{vp}Q_{pi} \tag{2}$$

where:

$Q_{pi}$ is the input flow to the pump;

$D_p$ is the displacement of the pump;

$\omega_p$ is the pump shaft rotation speed;

$Q_{po}$ represents the pump output flow rate; and $\eta_{vp}$ is the pump volumetric efficiency.

The variable displacement pump 202 is coupled to a controller 208, and the displacement of the variable displacement pump 202 can be changed with an electrical throttle command $v\in[-1,1]$ generated by the controller 208 and transmitted to the variable displacement pump 202. The controller 208 utilizes sensor measurements such as engine speed (driving the variable displacement pump 202 through gear transmission), pressures on high side $P_h$ and low side $P_l$, drum speed $\omega_{dr}$, cable tension at the surface, tool displacement h and speed $\dot{h}$. The controller 208 estimates effective drum radius r using a recursive least squares method. $J_c$, the inertia due to the cable on the drum, is calculated using the estimated effective drum radius r. When the controller 208 issues a command v, the actual pump displacement is related to the command through a nonlinear mapping (including both deadband and nonlinear flow curve). Hydraulic fluid flows into hydraulic circuit with flow rate determined by actual pump displacement. Hydraulic fluid flow generates load pressure across the variable displacement motor 204 (or torque on a shaft of the variable displacement motor 204). Through a mechanical transmission, motor torque moves the drum 102 with the cable 108 and the tool string 110 at the end of cable 108.

The controller 208 applies a backstepping control methodology that works back through system dynamics from tool desired motion to the pump displacement command. In the first operation, the controller 208 determines a desired load pressure such that tool motion will follow a desired motion profile. In a second operation, the actual pump displacement is set such that actual load pressure will follow desired load pressure synthesized in the first operation. The command v is determined through the inverse of nonlinear flow mapping. To compensate the large disturbance force acting on the tool string 110 during downhole operations and the uncertainties in the hydraulic loop modeling, a gradient decent learning algorithm may be used to estimate disturbance force and hydraulic loop modeling errors. The estimated parameter values may be used to improve control performance.

An electro-hydraulic actuator, of the variable displacement pump 202, with displacement feedback control is used to tilt a cradle swashplate such that the normalized pump displacement $\alpha\in[-1,1]$ will always follow the command v. $G_p$ is a positive flow gain. Because actuator dynamics are sufficiently fast for wireline operations, actuator dynamics may be ignored in the modelling and controller design. A nonlinear mapping function $f$ is used to characterize the relationship between the command v and actual displacement $\alpha$ including deadband and nonlinear gain.

The hydraulic flow going into and out of the hydraulic motor is modelled by following equation:

$$Q_{mo}=D_m\omega_m Q_{mi}=Q_{mo}/\eta_{vm} \tag{3}$$

where:

$Q_{mo}$ is the output flow of the motor; and $\omega_m$ is the motor speed.

In some implementations of the variable displacement motor 204, two fixed values of displacement are used. The motor displacement $D_m$ is modelled as a positive constant. $Q_{mi}$ is input flow rate of the variable displacement motor 204 and $\eta_{vm}$ is the motor volumetric efficiency. The torque generated by the variable displacement motor 204 is described by $$T_m=D_m(P_h-P_l)\eta_{tm} \tag{4}$$

where:

$T_m$ is the motor torque;

$P_h$ and $P_l$ represent pressures on high side and low side; and $\eta_{tm}$ is the motor mechanical efficiency.

The output flow of charge pump 206 is represented by:

$$Q_c=D_c\omega_p \tag{5}$$

where $D_c$ is the displacement of the charge pump 206.

The charge pump 206 and variable displacement pump 202 may be driven by a same shaft from the engine. The pressure dynamics is represented by following equations:

$$\frac{V_h}{\beta_e}\dot{P}_h = Q_{po} - Q_{mi} - Q_{lh} \tag{6}$$

$$\frac{V_l}{\beta_e}\dot{P}_l = Q_{mo} + Q_c - Q_{pi} - Q_{ll} \tag{7}$$

where:

$V_h$ and $V_l$ represent total fluid volumes on high-pressure side and low-pressure side;

$Q_{lh}$ and $Q_{ll}$ represents leakage flow on high-pressure side and low-pressure side; and $\beta_e$ is the effective bulk modulus of hydraulic fluid.

An output shaft of the variable displacement motor 204 drives the drum 102 through a gear transmission. The rotating speed $\omega_{dr}$ and the torque $T_{dr}$ acting on the drum 102 are given by:

$$\omega_{dr}=\omega_m/n\ T_{dr}=nT_m \tag{8}$$

where n is the transmission gear ratio.

The drum motion is governed by:

$$(J_{dr}+J_c)\ddot{\omega}_{dr}=T_{dr}-F_c r \tag{9}$$

where:

$J_{dr}$ represents drum inertia;

$J_c$ represents inertia due to cables on the drum; and r is the effective drum radius; and $F_c$ is the cable force.

Both $J_c$ and r can change during operation when cable is reeled in or released from the drum especially for deep wells.

The tool movement is governed by:

$$(\rho h+m_T)\ddot{h}=(\rho h+m_T)g-F_c+F_d \tag{10}$$

where $\rho$ is cable line mass density;

$m_T$ is the tool mass;

h is the tool displacement toward underground well; and $F_d$ is the disturbance force acting on the tool and cable during operation.

When cable 108 is long enough, force and displacement will propagate according to a wave equation. The cable 108 may be modelled as a rigid body and its dynamics ignored. The relationship between drum speed and tool speed is given by:

$$\dot{h}=\omega_{dr}r \tag{11}$$

In some implementations, symmetry in the hydraulic loop is assumed, which means $V_T=V_h=V_l$. The effective radius r changes slowly compared with system dynamics. It is assumed $\dot{r}=0$. Defining load pressure $P_L=P_h-P_l$ and state vector $x=[x_1, x_2, x_3]^T=[h, \dot{h}, P_L]^T$, the system dynamics equation (1)-(10) can be written as:

$$\begin{aligned} \dot{x}_1 &= x_2 \\ m_s\dot{x}_2 &= A_m x_3 + (\rho x_1 + m_T)g + F_d \\ \dot{x}_3 &= \frac{\beta_e}{V_T}[C_p\omega_p\alpha - C_m x_2 - D_c\omega_p + Q_L] \end{aligned} \tag{12}$$

where:

$Q_L=Q_{ll}-Q_{lh}$ represents the leakage flow;

$$\text{effective mass } m_s = \frac{J_d+J_c}{r^2} + \rho x_1 + m_T;$$

$$A_m = \frac{n}{r}D_m\eta_{tm};$$

$$C_p = (1+\eta_{vp})G_p;$$

$$C_m = \left(1+\frac{1}{\eta_{tm}}\right)D_m n/r;$$

and $\alpha=f(v)$ with v as the actual control input command.

Figure 3:
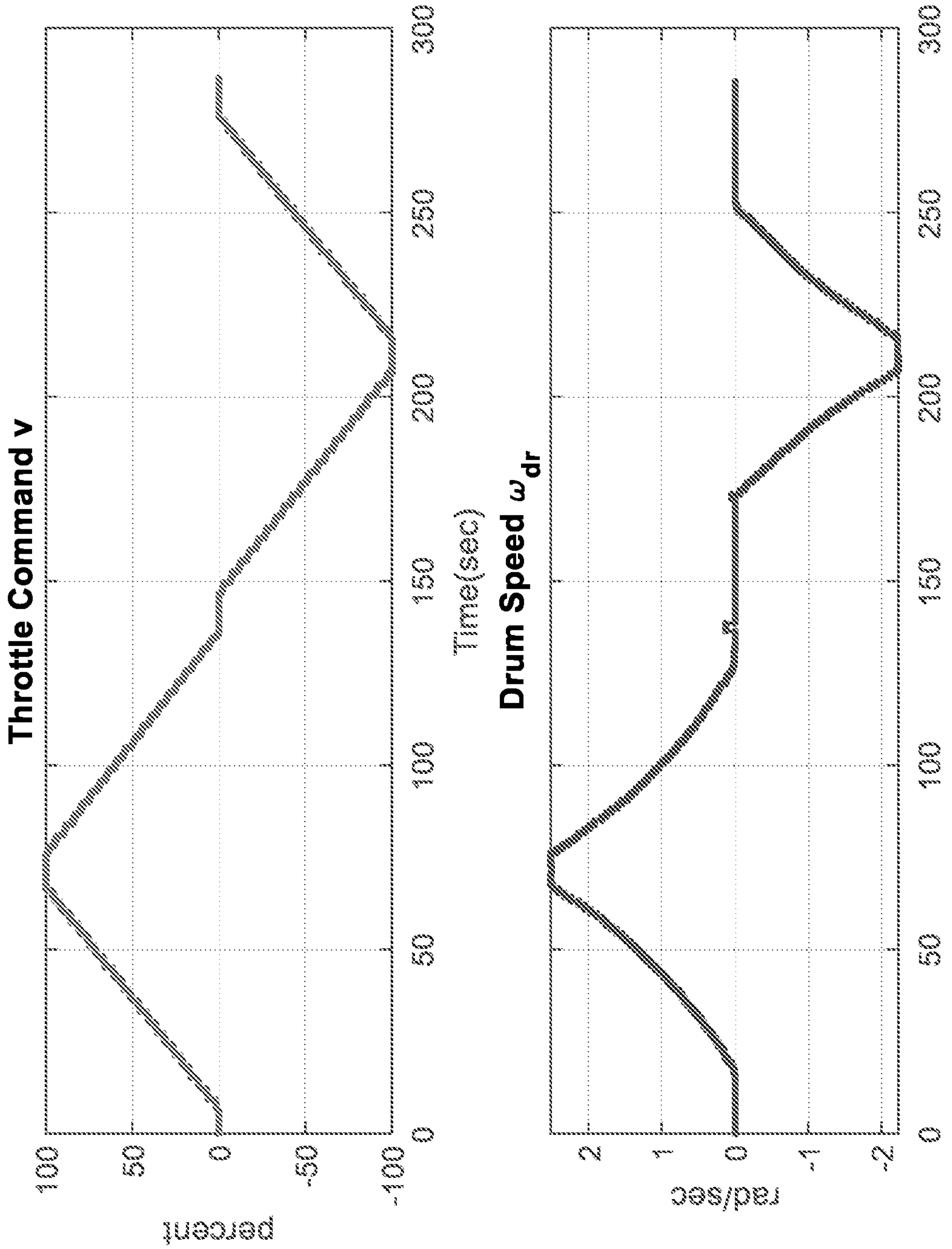
FIG. 3 shows results of open loop ramp testing to determine system dynamics.
Figure 4:
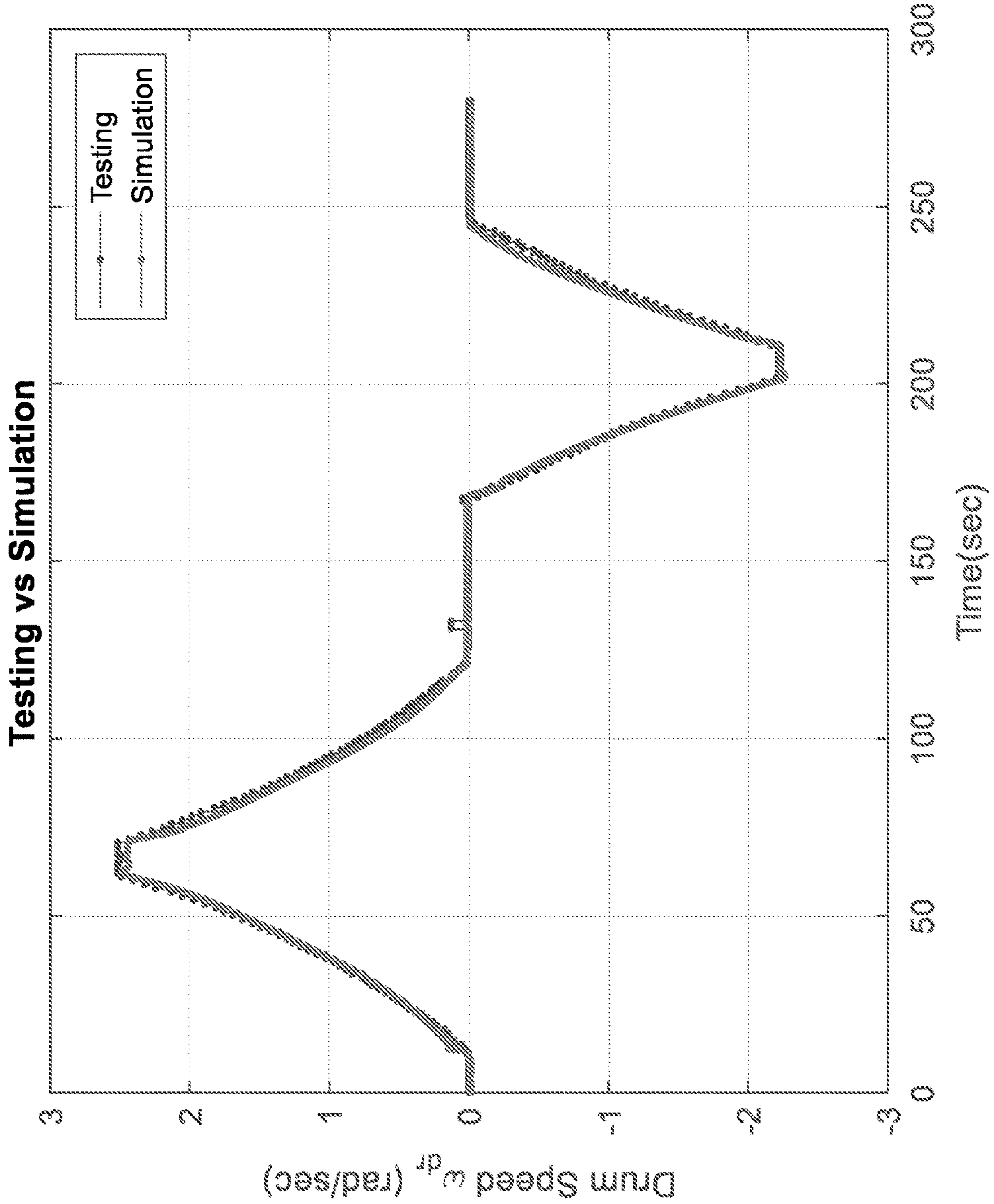
FIG. 4 shows a comparison between simulated and measured drum speed.

In some implementations of the hydraulic winch 200, engine speed which is related to pump shaft speed $\omega_p$ by a transmission ratio, drum speed $\omega_{dr}$, pressures on high side $P_h$ and low side $P_l$, and tool displacement h and speed $\dot{h}$ are measured. The effective drum radius r can be estimated from equation (11) using a recursive least square method. $J_c$, inertia due to cable on the drum, can be calculated with estimated effective drum radius r. System dynamics are identified via experimentation. FIG. 3 shows open loop ramp testing where the throttle command v is ramped from 0 to +/−100 percent. The response of drum rotating speed $\omega_{dr}$ shows significant dead band and nonlinearities. Since the actuator dynamics are ignored, the nonlinear mapping $f$ is modelled as a dead band and a nonlinear gain function fitted with a polynomial. A system model is applied for control design, model-in-loop and software-in-loop testing. FIG. 4 shows comparison between simulation and testing data.

Figure 5:
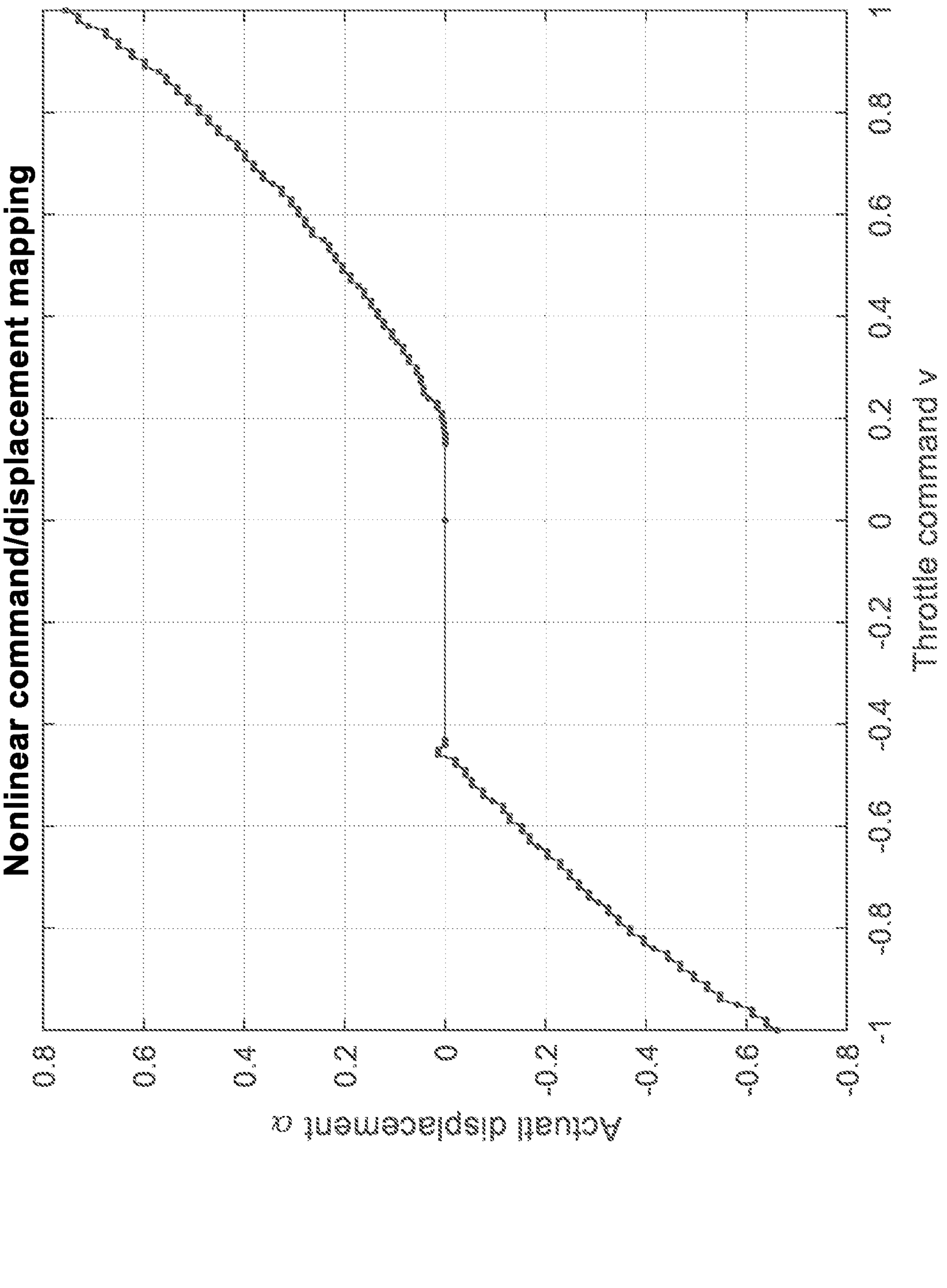
FIG. 5 shows nonlinearity in displacement of a variable displacement motor versus throttle command.

The system of equations (12) has nonlinearities represented by nonlinear mapping function $f$ shown in FIG. 5, changing effective drum radius r entering system dynamics in different places and changing effective mass $m_s$ due to reeling in or releasing cable. The system is also subjected to large uncertainties represented by large disturbance force $F_d$ in oil and gas operations and leakage flow $Q_L$. Both $F_d$ and $Q_L$ can also be treated as the modelling errors in the torque/force equations and hydraulic loop. To better compensate their effects, both $F_d$ and $Q_L$ can be separated into two parts: a slow varying part which can be captured and compensated by parameter adaptation and a fast-changing part can be attenuated by robust feedback. To utilize parameter adaptation, the system dynamics equation needs to be linearly parametrized by unknown parameters. Defining the unknown parameter set as:

$$\theta = [\theta_1, \theta_2]^T = \left[\frac{F_{dn}}{m_s}, \frac{Q_{Ln}\beta_e}{V_T}\right]^T,$$

where $F_{dn}$ and $Q_{Ln}$ are nominal part (or low frequency part) of $F_d$ and $Q_L$, the system of equations (12) can be written as:

$$\begin{aligned} \dot{x}_1 &= x_2 \\ \dot{x}_2 &= \frac{A_m}{m_s}x_3 + \frac{(\rho x_1 + m_T)}{m_s}g + \theta_1 + \tilde{F}_d \\ \dot{x}_3 &= \frac{\beta_e}{V_T}(C_p\omega_p\alpha - C_m x_2 - D_c\omega_p) + \theta_2 + \tilde{Q}_L \end{aligned} \tag{13}$$

where $$\tilde{F}_d = \frac{F_d - F_{dn}}{m_s} \text{ and } \tilde{Q}_L = \frac{\beta_e}{V_T}(Q_L - Q_{Ln})$$

represent uncertain nonlinearities, and the real control input, electronic pump throttle v, is related to the actual pump displacement α with nonlinear function $\alpha=f(v)$. The control problem is formulated as: given a desired motion trajectory $x_{1d}$, design a control law u for system control input v such that the tool motion output $x_1$ will track desired trajectory $x_{1d}$ as closely as possible.

Since the extent of parametric uncertainties and uncertain nonlinearities is known, the following practical assumptions may be made:

$$\theta \in \omega_\theta \triangleq \{\theta_{min} < \theta < \theta_{max}\}$$

$$|\tilde{F}_d(t,x_1,x_2)| \le \delta_F(t,x_1,x_2)$$

$$|\tilde{Q}_L(t,x)| \le \delta_Q(t,x). \tag{14}$$

Difficulties in implementing a controller for the system of equations (13) are:

1) the system is nonlinear as represented by nonlinear actuator mapping, changing effective drum radius and effective mass;
2) the system has large parametric uncertainties including large load changes $F_{dn}$ and hydraulic modelling error $Q_{Ln}$; and
3) the model uncertainties are mismatched, i.e. both parameter uncertainties and uncertain nonlinearities appear in the equation which is not directly related to control input u=v.

To address these challenges, the following strategies are adopted:

1) physical model based nonlinear analysis and synthesis is employed to address nonlinearities in the system dynamics;
2) ARC is used to handle both parametric uncertainties and uncertain nonlinearities; and
3) backstepping design via ARC Lyapunov function is used to overcome the design difficulties introduced by unmatched model uncertainties.

The following notations are used herein. Let $\hat{\theta}$ denote the estimation of $\theta$ and $\tilde{\theta}$ the estimation error ($\tilde{\theta}=\hat{\theta}-\theta$). From equations (14), a simple discontinuous projection can be defined as:

$$Proj_{\hat{\theta}_j}(\blacksquare_j)=\begin{cases}0 & \text{if } \hat{\theta}_j=\theta_{jmax} \text{ and } \blacksquare_j>0\\ 0 & \text{if } \hat{\theta}_j=\theta_{jmin} \text{ and } \blacksquare_j<0\\ \blacksquare_j & \text{otherwise}\end{cases} \tag{15}$$

where $\blacksquare_j$ is the jth element of vector $\blacksquare$.

By using an adaptation law given by:

$$\dot{\hat{\theta}}=\text{Proj}_{\hat{\theta}}(\Gamma\tau) \tag{16}$$

where $\Gamma>0$ is a diagonal adaptive gain matrix, and $\tau$ is the adaptation function to be synthesized later, it can be shown that:

$$\hat{\theta}\in\Omega_\theta \tag{17}$$

$$\tilde{\theta}^T(\Gamma^{-1}\text{Proj}_{\hat{\theta}}(\Gamma\tau)-\tau)\le 0$$

In a first operation, the controller 208 determines a desired load pressure $\alpha_2$ for system load pressure $x_3$ such that tool motion $x_1$ will follow the desired motion trajectory $x_{1d}$. An output tracking error $z_1=x_1-x_{1d}$ and a virtual speed command $x_{2eq}=\dot{x}_{1d}-k_1z_1$ are defined, the speed tracking error can be written as $z_2=x_2-x_{2eq}$. The derivative of the speed tracking error is given by:

$$\dot{z}_2=\frac{A_m}{m_s}x_3+\frac{\rho x_1+m_T}{m_s}g+\theta_1+\tilde{F}_d-\dot{x}_{2eq} \tag{18}$$

In equation (18), load pressure $x_3$ can be treated as a virtual control input function. A virtual control law $\alpha_2$ is synthesized for load pressure $x_3$ such that output tracking error $z_1$ converges to a small value with guaranteed transient performance. The resulting control function $\alpha_2$ is given by:

$$\alpha_2=\alpha_{2a}+\alpha_{2s} \quad \alpha_{2s}=\alpha_{2s1}+\alpha_{2s2} \tag{19}$$

$$\alpha_{2a}=-\frac{m_s}{A_m}\left(-\frac{\rho x_1+m_T}{m_s}g-\hat{\theta}_1+\dot{x}_{2eq}\right)$$

$$\alpha_{2s1}=-\frac{m_s}{A_m}k_2z_2$$

In equations (19), $\alpha_{2a}$ functions as the adaptive control part used to improve model compensation through online parameter adaptation. $\alpha_{2s}$ is the feedback control part where $\alpha_{2s1}$ is a regular linear feedback part and $\alpha_{2s2}$ is a robust feedback part satisfying the following conditions:

$$z_2\left(\frac{A_m}{m_s}\alpha_{2s2}-\tilde{\theta}^T\varphi_2+\tilde{F}_d\right)\le\varepsilon_2 \tag{20}$$

$$z_2\alpha_{2s2}\le 0$$

where $\varepsilon_2>0$ is a design parameter and $\varphi_2=[1\ 0]^T$. $\alpha_{2S2}$ can be synthesized using known methods. $z_3=x_3-\alpha_2$ denotes input discrepancy. For the positive-semidefinite function $$V_2=\frac{1}{2}\omega_2z_2^2,$$

its derivative is given by:

$$\dot{V}_2=\omega_2\frac{A_m}{m_s}z_2z_3+\omega_2z_2\left(\frac{A_m}{m_s}\alpha_{2s2}-\tilde{\theta}^T\varphi_2+\tilde{F}_d\right)-\omega_2k_2z_2^2 \tag{21}$$

In a second operation, the controller 208 synthesizes a control law $\alpha_3$ for the actual pump displacement $\alpha$ such that the load pressure $x_3$ will track the virtual control function $\alpha_2$ determined in the first operation. The actual control input u for the electrical throttle input v can be calculated from the inverse nonlinear mapping $f^{-1}$. The derivative of input discrepancy of the first operation can be written as:

$$\dot{z}_2=\frac{\beta_e}{V_T}(C_p\omega_p\alpha-C_mx_2-D_c\omega_p)+\theta_2+\tilde{Q}_L-\dot{\alpha}_{2c}-\dot{\alpha}_{2u} \tag{22}$$

where $$\dot{\alpha}_{2c}=\frac{\partial\alpha_2}{\partial x_1}x_2+\frac{\partial\alpha_2}{\partial x_2}\dot{\hat{x}}_2+\frac{\partial\alpha_2}{\partial\hat{\theta}}\dot{\hat{\theta}}+\frac{\partial\alpha_2}{\partial t}$$

is the calculable part of $\dot{\alpha}_2$ and can be used in control function design.

$$\dot{\alpha}_{2u}=\frac{\partial\alpha_2}{\partial x_2}(-\tilde{\theta}_1+\tilde{F}_d)$$

is the uncertain part of $\dot{\alpha}_2$ which needs to be addressed with robust feedback.

$$\dot{\hat{x}}_2=\frac{A_m}{m_s}x_3+\frac{(\rho x_1+m_T)}{m_s}g+\hat{\theta}_1$$

is the calculable part of $\dot{x}_2$. Defining a positive-semidefinite function $$V_3=V_2+\frac{1}{2}\omega_3z_3^2,$$

its derivative can be written as:

$$\dot{V}_3=\dot{V}_2|_{x_3=\alpha_3}+\omega_3z_3\left[\frac{\beta_e}{V_T}(C_p\omega_p\alpha-C_mx_2-D_c\omega_p)+\theta_2+\tilde{Q}_L-\dot{\alpha}_{2c}-\dot{\alpha}_{2u}+\frac{\omega_2}{\omega_3}\frac{A_m}{m_s}z_2\right] \tag{23}$$

Let control function $\alpha=\alpha_3$:

$$\alpha_3=\alpha_{3a}+\alpha_{3s} \quad \alpha_{3s}=\alpha_{3s1}+\alpha_{3s2} \tag{24}$$

$$\alpha_{3a}=\frac{1}{C_p\omega_p}\left[C_mx_2+D_c\omega_p+\frac{V_T}{\beta_3}\left(-\hat{\theta}_2+\dot{\alpha}_{2c}-\frac{\omega_2}{\omega_3}\frac{A_m}{m_s}z_2\right)\right]$$

$$\alpha_{3s1}=-\frac{1}{C_p\omega_p}\frac{V_T}{\beta_3}k_3z_3$$

$\alpha_{3s2}$ satisfies the following conditions:

$$z_3\left(\frac{\beta_e}{V_T}C_p\omega_p\alpha_{3s2} - \tilde{\theta}^T\varphi_3 + \tilde{Q}_L - \frac{\partial\alpha_2}{\partial x_2}\tilde{F}_d\right) \le \varepsilon_3 \tag{25}$$

$$z_3 u_{s2} \le 0$$

where $$\varphi_3 = \left[-\frac{\partial\alpha_2}{\partial x_2}, 1\right]^T.$$

From equations (23) and (24):

$$\dot{V}_3 = \dot{V}_2|_{x_2=\alpha_2} - \omega_3 k_3 z_3^2 + \omega_3 z_3\left(\frac{\beta_e}{V_T}C_p\omega_p\alpha_{3s2} - \tilde{\theta}^T\varphi_3 + \tilde{Q}_L - \frac{\partial\alpha_2}{\partial x_2}\tilde{F}_d\right) \tag{26}$$

The control command v can be calculated from inversed nonlinear mapping $v=f^{-1}(\alpha_3)$.

Parameter estimation may be updated according to the adaptation law of equation (16) in which $\tau=\Sigma_{j=2}^{3}\omega_j\varphi_j z_j$, and the control law of equation (23) will guarantee that:

1) the output tracking error $z=[z_1, z_2, z_3]^T$ are bounded and transient performance satisfies $$V_3(t) \le \exp(-\lambda_V t)V_3(0) + \frac{\varepsilon_V}{\lambda_V}[1 - \exp(-\lambda_V t)] \tag{27}$$

where $\lambda_V=2\min\{k_2, k_3\}$ and $\varepsilon_V=\omega_2\varepsilon_2+\omega_3\varepsilon_3$; and 2) If after a finite time $t_0$, $\tilde{F}_d=\tilde{Q}_L=0$, which means only parametric uncertainties are presented, asymptotic tracking can be achieved.

Figure 6:
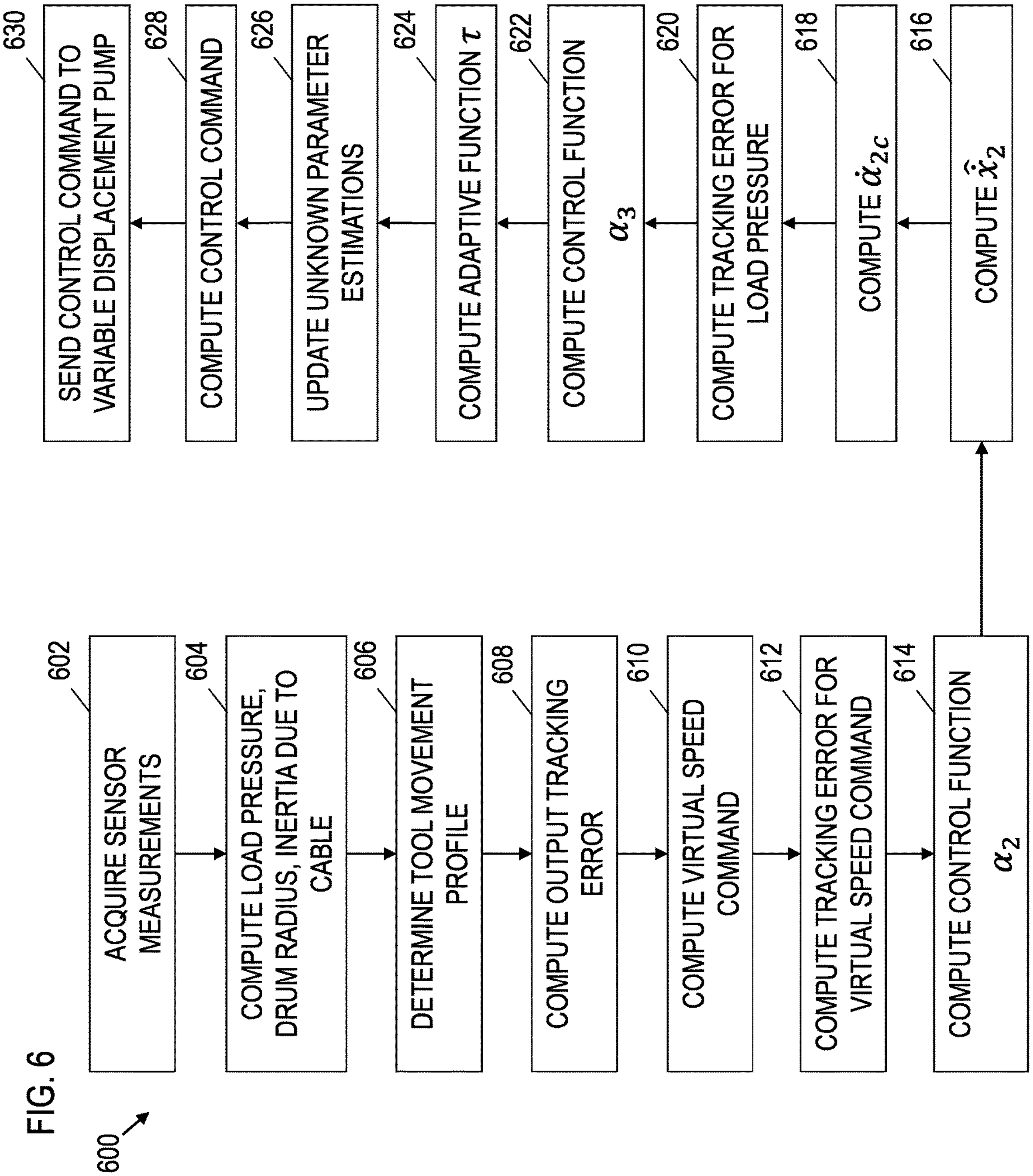
FIG. 6 shows a flow diagram for a method for controlling a hydraulic winch in accordance with the present disclosure.

FIG. 6 shows a flow diagram for a method 600 for controlling a hydraulic winch in accordance with the present disclosure. Though depicted sequentially as a matter of convenience, at least some of the actions shown can be performed in a different order and/or performed in parallel. Additionally, some implementations may perform only some of the actions shown. Operations of the method 600 may be performed by an implementation of the hydraulic winch 200.

In block 602, the controller 208 acquires sensor measurements for use in controlling the hydraulic winch 200. The sensor measurements include shaft speed ($\omega_p$) of the variable displacement pump 202, speed ($\omega_{dr}$) of the drum 102, high-side pressure ($P_h$), low-side pressure ($P_l$), depth or position (h) of the tool string 110, and speed ($\dot{h}$) of the tool string 110. The pump shaft speed may be measured by measuring speed of the engine driving the variable displacement pump 202 through a transmission having a known transmission ratio.

In block 604, the controller 208 computes load pressure, drum radius, and inertia due to the cable 108. Load pressure may be computed as: $P_L=P_h-P_l$. Drum radius r may be estimated from the relationship shown in equation (11) using recursive least square estimation. Drum radius r will be used as a known value in the inertia computation. Inertia due to the cable $J_c$ is computed from estimated drum radius and cable properties such as line mass and diameter.

In block 606, the controller 208 determines a desired movement profile for the tool string 110. The desired movement profile includes: desired tool depth as function of time $x_d(t)$, desired tool speed $\dot{x}_d(t)$, and desired tool acceleration $\ddot{x}_d(t)$.

A variety of constants are known to the controller 208 from the physical configuration of the hydraulic winch 200. The constants include:

$\eta_{vp}$: pump volumetric efficiency
$\eta_{vm}$: motor volumetric efficiency
$\eta_{tm}$: motor mechanical efficiency
$D_m$: motor displacement
$D_c$: charge pump displacement
$\beta_e$: effective bulk modulus of hydraulic fluid
$V_T$: total fluid volume in high pressure side and low pressure side (e.g., $V_T=V_h=V_l$)
n: transmission gear ratio between motor and drum
$J_{dr}$: drum inertia without cable
ρ: cable line mass
$m_T$: tool mass The relationship pump displace to the control command is defined as identification $\alpha=f(v)$ where $\alpha$ is actual pump displacement and v as the actual control input command.

In blocks 608-614, the controller 208 computes a desired load pressure $\alpha_2$ for system load pressure $x_3$ such that tool motion $x_1$ will follow the desired motion trajectory $x_{1d}$.

In block 608, the controller 208 computes an output tracking error $z_1=x_1-x_{1d}$.

In block 610, the controller 208 computes a virtual speed command $x_{2eq}=\dot{x}_{1d}-k_1z_1$ where $k_1$ is a positive control gain.

In block 612, the controller 208 computes tracking error for the virtual speed command $z_2=x_2-x_{2eq}$.

In block 614, the controller 208 computes a control function $\alpha_2$ according to equations (19) and (20).

In block 616-626, the controller 208 computes a control law $\alpha_3$ for the actual pump displacement $\alpha$ such that the load pressure $x_3$ will track the virtual control function $\alpha_2$ computed in blocks 608-614.

In block 616, the controller 208, computes $\hat{\dot{x}}_2$, the calculable part of $\dot{x}_2$, using $$\hat{\dot{x}}_2 = \frac{A_m}{m_s}x_3 + \frac{(\rho x_1 + m_T)}{m_s}g + \hat{\theta}_1.$$

In block 618, the controller 208 computes $\dot{\alpha}_{2c}$, the calculable part of $\dot{\alpha}_2$, using $$\dot{\alpha}_{2c} = \frac{\partial\alpha_2}{\partial x_1}x_2 + \frac{\partial\alpha_2}{\partial x_2}\hat{\dot{x}}_2 + \frac{\partial\alpha_2}{\partial\hat{\theta}}\dot{\hat{\theta}} + \frac{\partial\alpha_2}{\partial t}.$$

In block 620, the controller 208 computes tracking error for load pressure $z_3=x_3-\alpha_2$.

In block 622, the controller 208 computes control function $\alpha_3$ from equations (24) and (25).

In block 624, the controller 208 computes adaptive function $\tau=\Sigma_{j=2}^{3}\omega_j\varphi_j z_j$ where $$\varphi_2 = [1\ 0]^T,\ \varphi_3 = \left[-\frac{\partial\alpha_2}{\partial x_2}, 1\right]^T$$

and $\omega_j$ of are positive weights.

In block 626, the controller 208 updates unknown parameters estimation $\hat{\theta}$ using gradient updating law in equation (16) where $\Gamma$ is a 2*2 diagonal adaptive gain matrix.

In block 628, the controller 208 computes the actual control command v from the inverse of known relationship between $\alpha$ and v which is $v=f^{-1}(\alpha)=f^{-1}(\alpha_3)$.

In block 630, the controller 208 transmits the control command v to the variable displacement pump 202 to control the movement of the tool string 110.

Figure 7:
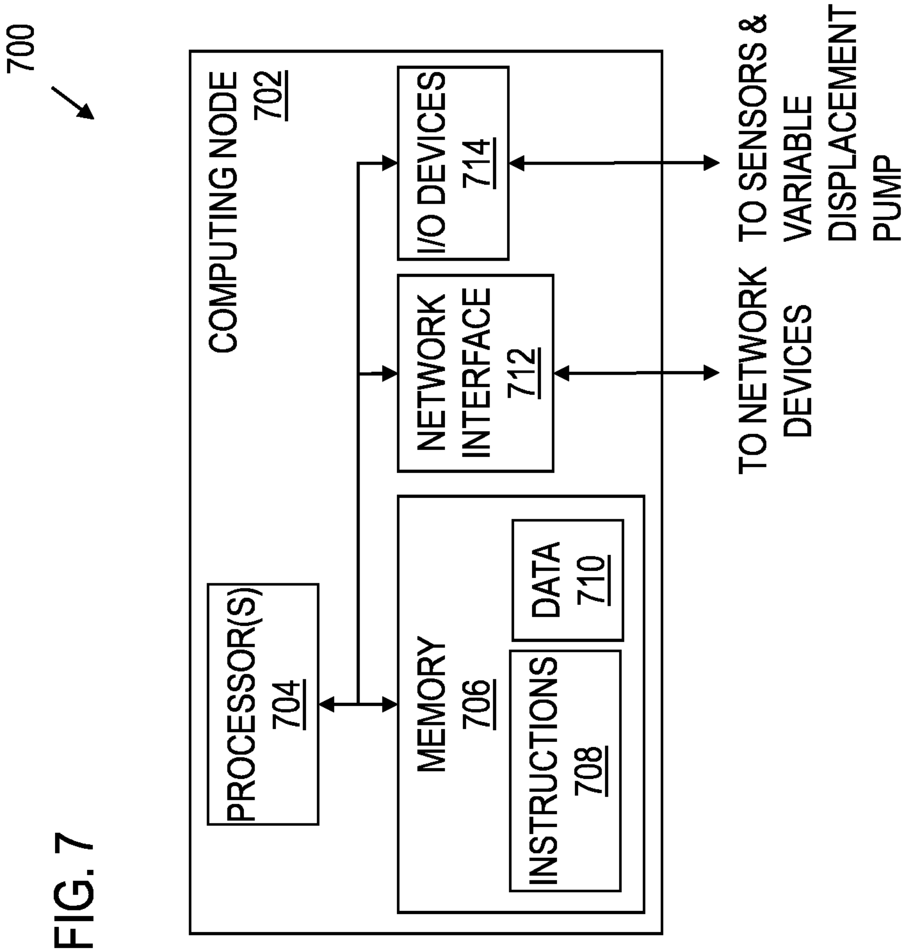
FIG. 7 shows a block diagram for an example computing system suitable for implementing a winch controller in accordance with the present disclosure.

FIG. 7 shows a block diagram for a computing system 700 suitable for implementing the controller 208. The computing system 700 includes one or more computing nodes 702. Each computing node 702 includes one or more processors 704 coupled to memory 706, a network interface 712, and one or more I/O devices 714. In various embodiments, a computing node 702 may be a uniprocessor system including one processor 704, or a multiprocessor system including several processors 704 (e.g., two, four, eight, or another suitable number). Processors 704 may be any suitable processor capable of executing instructions. For example, in various embodiments, processors 604 may be general-purpose or embedded microprocessors, graphics processing units (GPUs), digital signal processors (DSPs) implementing any of a variety of instruction set architectures (ISAs). In multiprocessor systems, each of the processors 704 may commonly, but not necessarily, implement the same ISA.

The memory 706 may include a non-transitory, computer-readable storage medium configured to store program instructions 708 and/or data 710 accessible by processor(s) 704. The memory 706 may be implemented using any suitable memory technology, such as static random-access memory (SRAM), synchronous dynamic RAM (SDRAM), nonvolatile/Flash-type memory, or any other type of memory. Program instructions 708 and data 710 implementing the functionality disclosed herein are stored within memory 706. For example, program instructions 708 may include instructions that when executed by processor(s) 704 implement the functionality of the controller 208 as disclosed herein.

The computing system 700 may also include secondary storage, which may be implemented using volatile or non-volatile storage and storage devices for storing information such as program instructions and/or data as described herein for implementing the controller 208. The secondary storage may include various types of computer-readable media accessible by the computing node 702. A computer-readable medium may include storage media or memory media such as semiconductor storage, magnetic or optical media, e.g., disk or CD/DVD-ROM, or other storage technologies.

The network interface 712 includes circuitry configured to allow data to be exchanged between computing node 702 and/or other devices coupled to a network. For example, the network interface 712 may be configured to allow data to be exchanged between a first instance of the computing system 700 and a second instance of the computing system 700. The network interface 712 may support communication via wired or wireless data networks.

The I/O devices 714 allow the computing node 702 to communicate with devices external to the computing node 702. Such external devices may include sensors for measuring operational parameters of the hydraulic winch 200 and/or the variable displacement pump 202. Examples of sensors coupled to the computing node 702 include a speed sensor measuring the speed of the engine driving the variable displacement pump 202, pressure sensors coupled to an inlet and an outlet of the variable displacement motor 204 for measuring high and low side hydraulic pressures, a sensor measuring tension of the cable 108, sensors measuring displacement or speed of the tool string 110, and other sensors. Various input/output devices such as one or more display terminals, keyboards, keypads, touchpads, scanning devices, voice or optical recognition devices, or any other devices suitable for entering or retrieving data by the computing node 702 may also be coupled to the I/O devices 714. Multiple input/output devices may be present in a computing system 700.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method for controlling a hydraulic winch to move a tool string within a wellbore, the method comprising:

receiving, at a controller, measurements from sensors associated with a variable displacement pump of the hydraulic winch;

estimating, by the controller, based on the received measurements:

an effective drum radius of a drum of the hydraulic winch, wherein the effective drum radius includes a cable at least partially wound around the drum; and an effective mass of the drum, wherein the effective mass accounts for a portion of the cable that is at least partially wound around the drum;

determining, by the controller, a desired movement profile for the tool string, wherein the desired movement profile includes at least a desired tool depth as a function of time;

generating, by the controller, a control command based on the estimated effective drum radius, the estimated effective mass of the drum, and the desired movement profile; and providing the control command to the variable displacement pump, wherein the variable displacement pump carries out the control command to cause the drum of the hydraulic winch to raise or lower the tool string according to the desired movement profile.

2. The method of claim 1, wherein the desired movement profile for the tool string further comprises a desired tool speed as a function of time.

3. The method of claim 1, wherein the desired movement profile for the tool string further comprises a desired tool acceleration as a function of time.

4. The method of claim 1, wherein the control command accounts for hydraulic modeling errors.

5. The method of claim 1, wherein the variable displacement pump is driven by an internal combustion engine.

6. The method of claim 1, wherein the variable displacement pump causes the drum of the hydraulic winch to raise or lower the tool string by causing a variable displacement motor to drive the drum based on hydraulic pressure created by the variable displacement pump.

7. The method of claim 6, wherein the variable displacement motor is also driven based on hydraulic pressure created by a charge pump.

8. The method of claim 1, wherein the sensors include at least one of: a speed sensor measuring the speed of an engine driving the variable displacement pump, a pressure sensor coupled to an inlet of a variable displacement motor, a pressure sensor coupled to an outlet of the variable displacement motor, a sensor measuring displacement of the tool string, and a sensor measuring speed of the tool string.

9. A hydraulic winch for moving a tool string within a wellbore, comprising:

a drum for winding or unwinding a cable attached to the tool string;

a variable displacement motor configured to drive the drum;

a variable displacement pump configured to drive the variable displacement motor; and a controller configured to provide control commands to the variable displacement pump, wherein the controller is further configured to perform stages comprising:

receiving measurements from sensors associated with the variable displacement pump;

estimating based on the received measurements:

an effective drum radius of the drum, wherein the effective drum radius includes a cable at least partially wound around the drum; and an effective mass of the drum, wherein the effective mass accounts for a portion of the cable that is at least partially wound around the drum;

determining a desired movement profile for the tool string, wherein the desired movement profile includes at least a desired tool depth as a function of time;

generating a control command based on the estimated effective drum radius, the estimated effective mass of the drum, and the desired movement profile; and providing the control command to the variable displacement pump, wherein the variable displacement pump carries out the control command to cause the drum of the hydraulic winch to raise or lower the tool string according to the desired movement profile.

10. The hydraulic winch of claim 9, wherein the desired movement profile for the tool string further comprises a desired tool speed as a function of time.

11. The hydraulic winch of claim 9, wherein the desired movement profile for the tool string further comprises a desired tool acceleration as a function of time.

12. The hydraulic winch of claim 9, wherein the control command accounts for hydraulic modeling errors.

13. The hydraulic winch of claim 9, wherein the variable displacement pump is driven by an internal combustion engine.

14. The hydraulic winch of claim 9, wherein the variable displacement pump causes the drum of the hydraulic winch to raise or lower the tool string by causing the variable displacement motor to drive the drum based on hydraulic pressure created by the variable displacement pump.

15. The hydraulic winch of claim 14, wherein the variable displacement motor is also driven based on hydraulic pressure created by a charge pump.

16. The hydraulic winch of claim 9, wherein the sensors include at least one of: a speed sensor measuring the speed of an engine driving the variable displacement pump, a pressure sensor coupled to an inlet of the variable displacement motor, a pressure sensor coupled to an outlet of the variable displacement motor, a sensor measuring displacement of the tool string, and a sensor measuring speed of the tool string.

17. A controller for controlling a hydraulic winch to move a tool string within a wellbore, wherein the controller carries out instructions stored in a non-transitory, computer-readable medium to perform stages comprising:

receiving measurements from sensors associated with a variable displacement pump of the hydraulic winch;

estimating based on the received measurements:

an effective drum radius of a drum of the hydraulic winch, wherein the effective drum radius includes a cable at least partially wound around the drum; and an effective mass of the drum, wherein the effective mass accounts for a portion of the cable that is at least partially wound around the drum;

determining a desired movement profile for the tool string, wherein the desired movement profile includes at least a desired tool depth as a function of time;

generating a control command based on the estimated effective drum radius, the estimated effective mass of the drum, and the desired movement profile; and providing the control command to the variable displacement pump, wherein the variable displacement pump carries out the control command to cause the drum of the hydraulic winch to raise or lower the tool string according to the desired movement profile.

18. The controller of claim 17, wherein the desired movement profile for the tool string further comprises at least one of a desired tool speed as a function of time and a desired tool acceleration as a function of time.

19. The controller of claim 17, wherein the variable displacement pump causes the drum of the hydraulic winch to raise or lower the tool string by causing a variable displacement motor to drive the drum based on hydraulic pressure created by the variable displacement pump.

20. The controller of claim 17, wherein the sensors include at least one of: a speed sensor measuring the speed of an engine driving the variable displacement pump, a pressure sensor coupled to an inlet of a variable displacement motor, a pressure sensor coupled to an outlet of the variable displacement motor, a sensor measuring displacement of the tool string, and a sensor measuring speed of the tool string.

* * * * *